Jan. 26, 1960   W. STELZER   2,922,679
TRACTOR-TRAILER BRAKE SYSTEM
Filed May 4, 1956   2 Sheets-Sheet 1
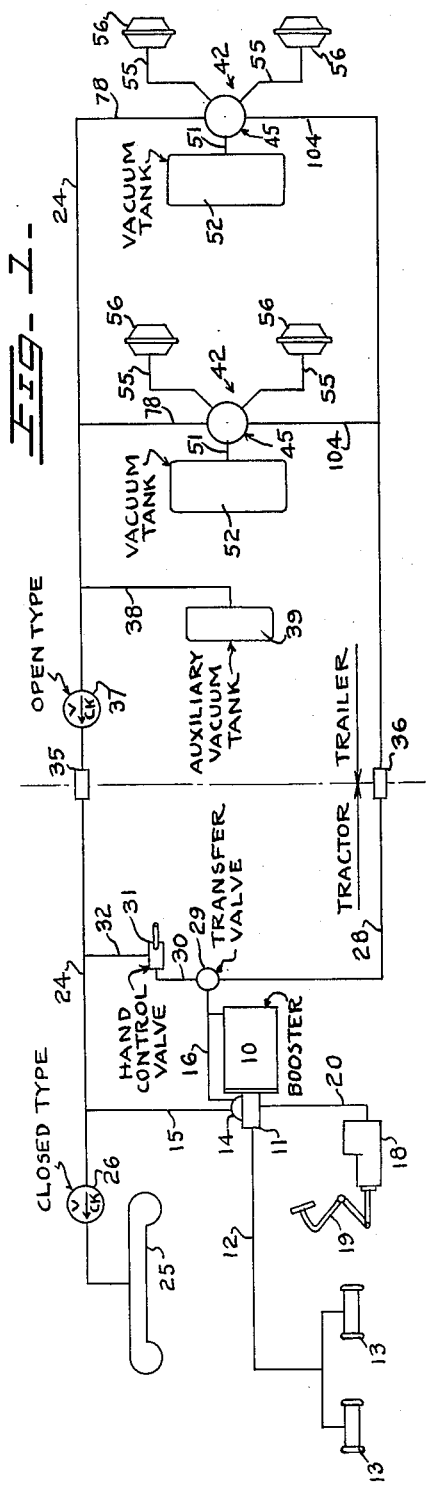
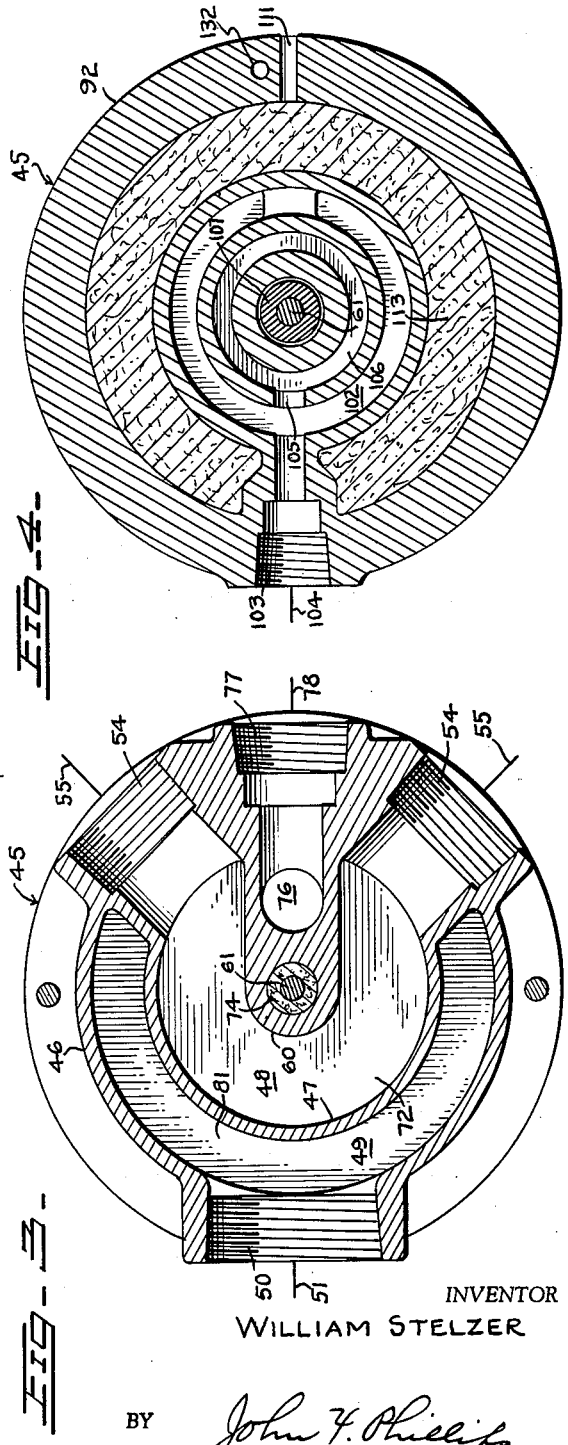
INVENTOR
WILLIAM STELZER
BY John F. Phillips
ATTORNEY

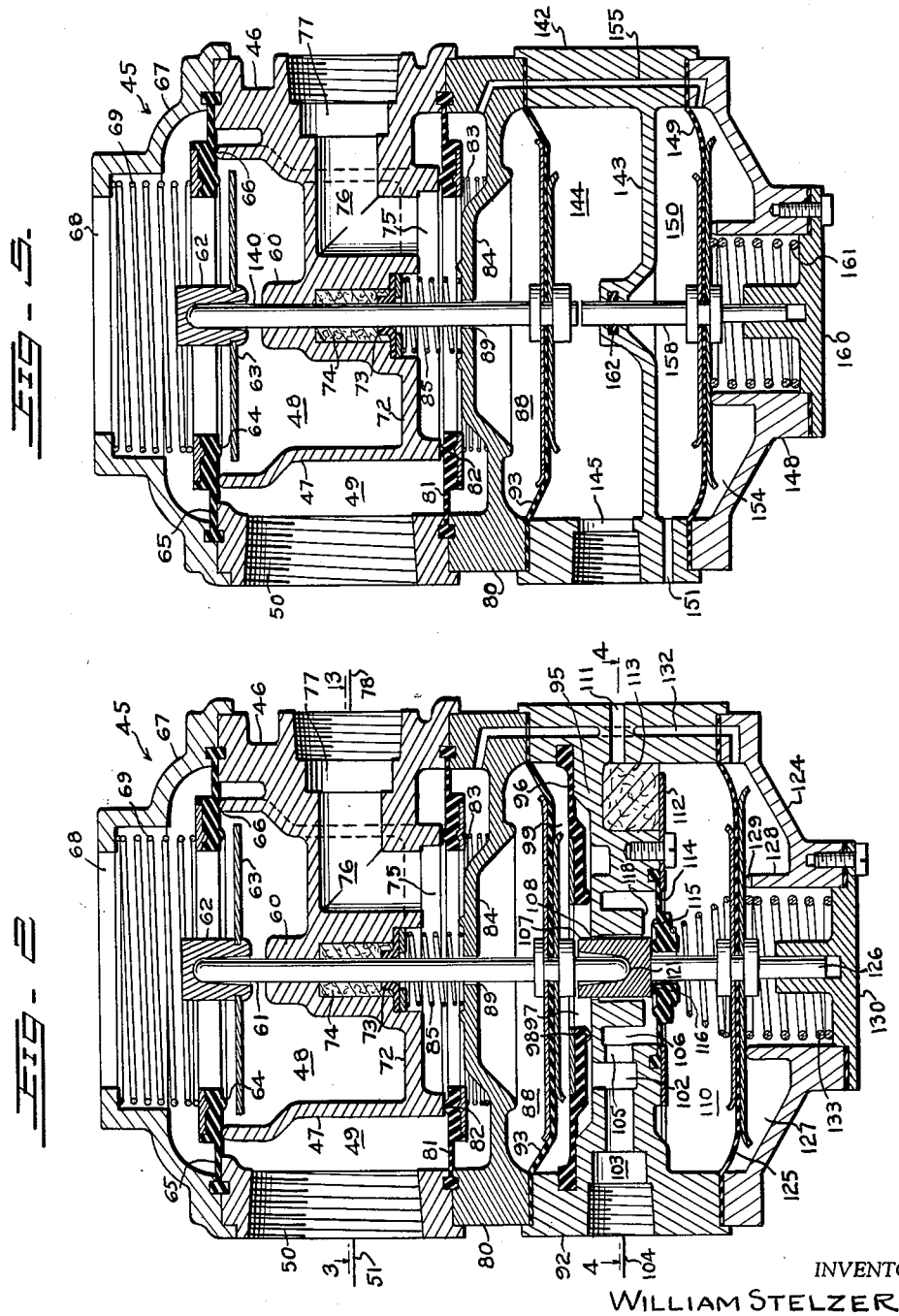

2,922,679

TRACTOR-TRAILER BRAKE SYSTEM

William Stelzer, Summit, N.J., assignor to Kelsey-Hayes Company, a corporation of Delaware Application May 4, 1956, Serial No. 582,839

10 Claims. (Cl. 303—31)

This invention relates to a vacuum brake system for a trailer towed by an automotive vehicle, and particularly to a type of system wherein a normally closed check valve prevents the lowering of the vacuum in the trailer vacuum tank in response to a lower vacuum in the supply line leading from the tank to the vacuum source on the towing vehicle.

The new so-called closed tractor-trailer brake system includes a conversion valve responsive to a pressure difference between the conventional vacuum supply line and the control line leading from the towing vehicle to the trailer to apply the trailer brakes by connecting the trailer vacuum tank to the vacuum brake operating motors of the trailer, the control line being adapted to have its pressure increased therein by operation of a vacuum booster motor on the tractor, or a hand control valve.

An important object of the present invention is to provide means to conserve the highest vacuum in the trailer vacuum tank to provide a maximum power reserve, and to provide a novel type of conversion valve responsive to a pressure impulse in the control line relative to pressure existing in the vacuum supply line, to energize the vehicle brakes, the conservation of vacuum in the vacuum tank rendering a full trailer brake application obtainable at all times.

A further object is to provide in combination with the conversion valve an automatic trailer brake applying device which operates to connect the trailer brake motors to the trailer vacuum tank whenever vacuum in the supply line is reduced to a predetermined unsafe level.

A further object is to provide such a mechanism wherein the automatic brake applying device functions to close off the control line to the tractor to prevent transmission of atmospheric pressure through the control line to the tractor when the trailer brakes are automatically applied, while permitting the transmission of pressure impulses from the tractor to the conversion valve to operate the trailer brakes.

A further object is to provide a novel combination of a conversion valve, an automatic brake applying device and a check valve protecting the vacuum tank and wherein such combined devices cooperate with each other to make the so-called closed system practicable.

A further object is to provide a system of the character referred to having an auxiliary vacuum tank on the trailer connected to the supply line rearwardly of a normally open or velocity check valve in the supply line, whereby upon the rupturing of the coupling between the tractor and trailer, such valve will close and the auxiliary vacuum tank maintains vacuum in such a manner in the combined conversion and automatic brake applying valve as to maintain the full operativeness of the latter.

Other objects and advantages of the invention will become apparent during the course of the following description.

In the drawings I have shown two embodiments of the invention. In this showing:

Figure 1 is a diagrammatic view of the entire tractor-trailer brake system;

Figure 2 is an axial sectional view through one form of combined conversion and automatic brake applying valve;

Figure 3 is a section on line 3—3 of Figure 2;

Figure 4 is a similar view on line 4—4 of Figure 2; and

Figure 5 is a view similar to Figure 2 showing a modified type of the valve mechanism shown therein.

Referring to Figure 1, the numeral 10 designates a booster motor of the vacuum suspended type on the tractor or towing vehicle. This motor may be of any desired type and preferably is of the type shown, for example, in the patent to David T. Ayers, Jr., No. 2,852,921, granted September 23, 1958, and in the copending application of Jeannot G. Ingres, Serial No. 455,647, filed September 13, 1954, now Patent No. 2,905,151, granted September 22, 1959. Such motor has a vacuum suspended pressure responsive unit (not shown) movable upon energization of the motor to displace hydraulic fluid from a hydraulic chamber 11 through lines 12 to the wheel cylinders 13 of the tractor, two of such wheel cylinders being illustrated.

The booster is controlled through the medium of a valve mechanism diagrammatically indicated by the numeral 14. In accordance with the disclosure of the copending application referred to, this valve mechanism has an atmospheric port (not shown), a vacuum line 15 connected thereto, and a jumper line 16 connected between the valve mechanism and the remote end of the motor 10 in which vacuum is normally maintained.

Also as disclosed in the copending application referred to, a master cylinder 18 is operable by a pedal 19 to displace fluid through a line 20 to the valve mechanism 14. Operation of the valve mechanism disconnects the jumper line 16 from the source of vacuum and connects it to the atmosphere, thus dumping air into the rear end of the motor 10 to actuate it and apply the tractor brakes. Preferably, fluid displaced from the master cylinder 18 assists the motor 10 in generating pressure in the wheel cylinders 13.

The vacuum line 15 is tapped into a vacuum supply line 24 the forward end of which is connected to a source of vacuum such as the intake manifold 25 of the tractor engine. Between such manifold and the pipe 15 is arranged a check valve 26 of the closed type, that is, a valve of the type which is biased to closed position and which remains in such position whenever pressures forwardly and rearwardly of the check valve 26 are equal or the pressure forwardly of the check valve is below the pressure rearwardly of the check valve.

The brake mechanism for the trailer is controlled by pressure impulses in a control line indicated by the numeral 28. Such line is connected to a conventional transfer valve 29 which is also connected to the jumper line 16. The transfer valve is also connected by a line 30 to a conventional hand control valve 31, and such valve is connected in turn through a line 32 to the vacuum supply line 24.

Between the tractor and trailer, as indicated in Figure 1, the lines 24 and 28 are provided respectively with conventional connectors 35 and 36 respectively. Rearwardly of the connector 35, the vacuum supply line 24 is provided with a check valve 37 of the open type, that is, a valve of the type which is normally open but which is adapted to be closed by a rush of air into the line 24 forwardly of the valve 37 upon a rupturing of the line 24, or example if a break-away of the tractor and trailer occurs. Rearwardly of the check valve 37, a line 38 is connected between the vacuum supply line 24 and an auxiliary vacuum tank 39 the function of which will be referred to below.

Two brake applying units for the trailer have been shown in Figure 1 and the parts of such units are identical. Accordingly, only one such unit need be described in detail. These units are indicated as a whole by the numeral 42.

Each unit 42 comprises a combined conversion and emergency brake applying valve indicated as a whole by the numeral 45 and shown in detail in Figures 2, 3 and 4. Referring to Figure 2, each combined valve device 45 comprises a valve body 46 having an arcuate wall 47 therein dividing the body to form inner and outer chambers 48 and 49 the latter of which is provided with a port 50 connected by a line 51 (Figure 1) to a vacuum tank or reservoir 52. The inner chamber 48 is provided with ports 54 (Figure 3) connected by lines 55 (Figure 1) to the normally air suspended brake applying motors 56 associated with one pair of the trailer wheels. These motors become operative by evacuation of air, in a manner to be described, through the lines 55.

The valve body 46 is provided axially thereof with a bearing 60 slidably accommodating an axial stem 61 engaging an upper boss 62 which carries a valve plate 63. This valve plate is normally disengaged from but is engageable with a valve seat 64 carried by a diaphragm 65. The upper extremity of the wall 47 forms a valve seat 66 normally engaged by the diaphragm 65 as shown in Figure 2.

The peripheral bead of the diaphragm 65 is secured in position between the valve body 46 and a top cap member 67 open at its top as at 68 and preferably provided with an air cleaner (not shown). A spring 69 in the cap 67 biases the valve diaphragm 65 to closed position in engagement with the seat 66. The body 46 is provided with a bottom wall 72 from which the bearing 60 projects upwardly. In an axial recess in the bottom wall 72 is arranged a seal 73 surrounding the stem 61 and above which is arranged a body of material 74 such as felt. The space beneath the wall 72 forms part of a chamber 75 to be referred to later. Such chamber opens into a duct 76 formed in the body 46 and provided with a port 77 connected by a line 78 (Figure 1) to the vacuum supply line 24.

A filler body 80 is secured against the bottom of the body 46 and between the bodies 46 and 80 is clamped the peripheral bead of a diaphragm 81. The lower extremity of the wall 47 forms a valve seat engageable with a raised bead 82 formed on the diaphragm 81, this valve element being normally closed as in Figure 2 and being biased to closed position by a spring 83. This spring rests at its lower end on a closed web 84 formed integral with the filler body 80. A spring 85 seats at its lower end against the web 84 and acts at its upper end against the seal 73. The diaphragm 81 is annular as shown in Figure 2, having a large axial opening whereby the space above the web 84 is open to and forms a part of the chamber 75. The space below the web 84 forms a chamber 88, and this chamber communicates with the chamber 75 through a clearance 89 provided around the stem 61.

A lower valve body 92 is arranged beneath the body 80 and cooperates therewith to clamp in position the peripheral portion of a diaphragm 93 fixed to the stem 61. The diaphragm 93 forms the bottom of the chamber 88. The lower valve body 92 is provided with a web 95 extending thereacross. Above this web and carried by the body 92 is a diaphragm 96 having an axial opening 97 therethrough and provided with a surrounding valve bead normally seating against the top of the web 95. The space between the diaphragm 93 and web 95 forms a chamber 99.

The web 95 is provided with an upwardly opening annular groove 102 communicating through a port 103 with a line 104 (Figure 1) tapped into the control line 28. The groove 102 opens as at 105 into a downwardly opening groove 106 formed in the web 95. This web slidably supports a valve 107, there being clearance 108, preferably through the use of splines around the valve 107 whereby the chamber 99 communicates with the groove 106.

Beneath the web 95 the body 92 is provided with an atmospheric chamber 110 open to the atmosphere through a port 111. Beneath the web 95 is secured a plate 112 supporting in position a body of air filtering material 113. The plate 112 secures in position relative to the web 95 a diaphragm 114 having valve seats 115 and 116 the latter of which normally engages the bottom of the valve 107. The member 115 forms in effect a valve engageable with a seat 118 formed adjacent the lower portion of the groove 106.

It will be noted that the lower end of the stem 61 seats in a recess 121 in the top of the valve 107. Therefore, upward movement of the valve 107 moves the stem 61 vertically, while this stem is movable upwardly independently of the valve 107.

A lower cap 124 is fixed with respect to the bottom of the body 92 and secures in position the periphery of a diaphragm 125 fixed to a stem 126 by the upper end of which the valve 107 is carried. The diaphragm 125 forms the bottom of the chamber 110 and divides such chamber from a chamber 127 formed in the cap 124. The lower plate of the diaphragm 125 seats against the top of an annular wall 128 formed integral with the body 124 and notched as at 129 so that the interior of the wall 128 forms a part of the chamber 127. A closure plate 130 is secured to the bottom of the cap 124 and slidably supports the lower end of the stem 126. It will be noted that atmospheric pressure is always present in the chamber 110, and this pressure normally acts downwardly to maintain the diaphragm 125 in its normal position, the chamber 127 being connected by a duct 132 to the chamber 75 in which vacuum is always present except under circumstances referred to below. A relatively heavy spring 133 is arranged within the wall 128 to bias the diaphragm 125 upwardly.

The form of the device shown in Figure 5 is identical with that shown in Figure 2 down to and including the filler body 80 and diaphragm 93. Such elements as are common to the two devices, therefore, have been indicated by the same reference numerals and need not be specifically described. The stem 140 in Figure 5 is identical with the stem 61 previously described except that it terminates just below the diaphragm 93.

Instead of the lower body 92, a different type of body 142 is secured with respect to the body 80 and cooperates therewith to clamp the diaphram 93 in position. The body 142 has a horizontal web or wall 143 therein, and the body 142 and diaphragm 93 cooperate to form a chamber 144 communicating with a port 145 which communicates with the fluid line 104 (Figure 1) connected to the control line 28. Accordingly, the chamber 144 is subject to changes in pressure in the control line 28.

A lower cap structure 148 secures in position with respect to the body 142 a diaphragm 149 identical with the diaphragm 125. Between the diaphragm 149 and web 143 is formed a chamber 150 open to the atmosphere as at 151. The cap structure 148 defines with the diaphragm 149 a bottom chamber 154 which, as is true of the chamber 126 (Figure 2) communicates through a passage 155 with the chamber 75.

As distinguished from the stem 126 of the other form of the invention, the diaphragm 149 is connected to a stem 158 the lower end of which is guided by a cover plate 160, and the upper end of the stem 158 is straight and terminates slightly below the lower extremity of the stem 140. A spring 161, similar to the spring 133, urges the diaphragm 149 upwardly. The stem 158 operates through a seal 162 in the web 143, thus sealing the chambers 144 and 150 from each other.

Operation

The operation of the form of the invention shown in Figures 1–4, inclusive, is as follows. The parts normally occupy the positions shown in Figure 2. The valve plate 63 (Figure 2) being open, the chamber 48 communicates with the atmosphere through the opening 68. The trailer brake motors 56 accordingly communicate with the atmosphere and are air-suspended.

It is assumed of course that vacuum is present in the supply line 24 and control line 28, in which case the booster motor 10 will be vacuum-suspended and air will be evacuated from the tanks 39 and 52. The brakes are applied by operating the pedal 19 in the usual manner, thus operating the valve mechanism 14 to disconnect the jumper line 16 from the vacuum pipe 15 and connecting it to the atmosphere, whereby the brake cylinders 13 will be operated. The admission of air into the jumper line 16 operates, through the conventional transfer valve 29, to raise the pressure in the control line 28. Air will be admitted through port 103 (Figure 2) into the groove 102 past valve 98, and also through port 105, groove 106 and, around through the clearance 108, into the chamber 99, thus lifting the diaphragm 93. It will be recalled that vacuum will have been present in the chamber 75, and air will be exhausted from chamber 88 through the clearance 89. The admission of pressure into the chamber 99 thus raises the diaphragm 93 and lifts the stem 61 to move the valve plate 63 into engagement with the seat 64 and to thereafter raise the diaphragm 65. These operations close the chamber 48 to the atmosphere and open it around the valve seat 66 to communication with the chamber 49 which is always in communication through port 50 and pipe 51 with the vacuum tank 52. This operation takes place with respect to the elements of both of the units 42 (Figure 1), as will be apparent.

The connection of the chamber 48 to the source of vacuum exhausts air from the vacuum motors 56, these motors communicating with the chamber 48 through lines 55 and ports 54 (Figure 3). The application of the truck brakes thus results in application of the trailer brakes.

The chamber 75 (Figure 2) is in fixed communication with the vacuum supply line through the pipe 78 (Figure 1), and any vacuum existing in the supply line will be duplicated in the chamber 75. The diaphragm 81 acts as a normally closed check valve. Whenever pressure in the supply line and consequently in the chamber 75 is equal to or above the pressure in the chamber 49 and the vacuum tank 52, the valve 82 will be closed. Whenever such pressure conditions are reversed, the check valve 82 will open and air will be exhausted from the chamber 75 and passage 76 and consequently from the vacuum tank 52. Accordingly, the highest possible vacuum is always maintained in the vacuum tank 52.

The foregoing operation of connecting the trailer brake motors 56 to the vacuum tank takes place without movement of the diaphgram 125, the lower end of the stem 61 moving upwardly out of the socket 121. This is due to the fact that the chamber 110 always communicates with the atmosphere through port 111 while the chamber 127, under normal conditions, is always under vacuum conditions, being evacuated through passage 132. Accordingly, the lower plate of the diaphragm 125 will remain in engagement with the upper end of the wall 128, the air pressure in the chamber 110 maintaining the spring 133 compressed.

The foregoing operation, of course, also may be performed so far as the trailer brakes are concerned by operating the hand valve 31 in the usual manner. Operation of such valve will cut off communication between the control line 28 and the vacuum pipe 32 and dump air through the transfer valve 29 into the line 28. This will effect a rise in pressure in the chamber 99 (Figure 2) in exactly the same manner as if the booster 10 were operated.

When the brakes are to be released, the hand valve 31 will be returned to its normal position or the brake pedal 19 released. This operation, in either case, will connect the control line 28 to the vacuum line 24. The valve 98 (Figure 2) will seat, but air will be exhausted from the chamber 99 through the clearance 108, beneath the valve seat 118 and through groove 106 and port 105. Pressure accordingly will be balanced on opposite sides of the diaphragm 93. The upward force transmitted to the stem 61 accordingly will be released, and air pressure acting on the top of the valve plate 63 will move this plate downwardly. Thus the chamber 48 will again be connected to the atmosphere, and the valve diaphragm 65 will engage the valve seat 66 to disconnect chambers 48 and 49. The trailer brake motors 56 again will be air suspended. The conversion valve per se, comprising the valve plate 63 and associated elements, forms no part of the present invention, but is disclosed in the patent to D. F. Searle, No. 2,204,706, granted June 18, 1940.

The patent referred to does not employ in conjunction therewith a valve corresponding to the check valve 82 which operates in the present case to maintain maximum vacuum in the tank 52 as previously described. If, during the application of the brakes as described above, the exhaustion of air from the trailer braking motors raises the pressure in the vacuum tank 52 above the vacuum in the supply line 24, such increased pressure will be duplicated in the chamber 49, of course, in which case the valve 82 will open to connect the chamber 49 to the chamber 75 to exhaust air from the chamber 49 and thus from the vacuum tank 52 to maintain maximum vacuum therein. The present device thus operates under all normal conditions to maintain the highest possible vacuum in the tank 52, thus increasing the effectiveness of such tank for applying the trailer brakes.

If the brakes are released, it will be apparent that the same vacuum will exist in the supply line 24 and control line 28, such lines communicating with each other, for example through the jumper line 16, valve mechanism 14, and pipe 15. If a leakage is introduced in either the vacuum supply line 24 or control line 28 greater than the capacity of the vacuum source 25 to take care of it, there will be a drop in vacuum in both lines 24 and 28.

If such vacuum drops below a predetermined level, for example 8″ of mercury, for which the diaphragm 125 and spring 133 are proportioned, there will be a decrease in the differential pressures affecting opposite sides of the diaphragm 125. Under such conditions, the spring 133 will expand, moving the stem 126 upwardly together with the valve 107 and stem 61. This operation in itself will crack the valve 65, a result which takes place in the form of the invention shown in Figure 5, as referred to below. With the structure shown in Figure 2, upward movement of the valve 107 permits the valve seat 116 to move upwardly until the valve element 115 engages the seat 118. Beyond such point, the bottom of the valve 107 will move away from the valve seat 116, whereupon air will flow from the chamber 110 through the center of the diaphragm 114 and upwardly through the clearance 108 into the chamber 99. The increase in pressure in the chamber 99 accomplishes the same result as the application of the tractor brakes or the operation of the hand valve 31, namely, to exert an upward force on the diaphragm 93 and stem 61 to close the valve 63 and move the diaphragm 65 out of engagement with the seat 66. The previously described result takes place, the chambers 48 and 49 being connected to evacuate the trailer brakes 56, thus effecting a substantial application of the trailer brakes to bring the vehicle combination to a stop. At the same time, however, the check valve 98 remains closed. Accordingly, there will occur no rise in pressure in the control line 28, and the tractor brakes will be unaffected and will remain under the control of the operator.

In the event of a trailer break-away at the couplings 35 and 36, the inrush of air into the vacuum line 24 rearwardly of the coupling 35 will close the check valve 37, thus preserving vacuum in the auxiliary tank 39. Atmospheric pressure in the rear end of the control line 28, acting beneath the diaphragm 93 as previously described, will apply the trailer brakes and bring the trailer to a stop. The auxiliary tank 39 is very important under such conditions. It will be noted that the chamber 88 is normally subject to vacuum, being evacuated through the clearance 89 into the chamber 75, this chamber being open through pipe 78 to the supply line 24. In the absence of the vacuum tank 39, with the open type check valve 37, a break-away of the type referred to would raise pressure in both of the lines 24 and 28, resulting in atmospheric pressure above and below the diaphragm 93 so that control line pressure beneath the diaphragm 93 would not raise it to set the trailer brakes. The tank 39 maintains vacuum in the chamber 88, thus rendering atmospheric pressure in the chamber 99 effective for raising the diaphragm 93.

The use of the open type check valve 37 is highly desirable in the present system. This valve permits a balancing of pressures in the rear end of the supply line 24 and in the control line 28, variations in the source vacuum affecting both of these lines in the same manner. Therefore, pressures in the chambers 88 and 99 are normally balanced to prevent any biasing forces against the diaphragm 93.

Should the vacuum in the auxiliary tank 39 be destroyed, with a simultaneous failure of the vacuum source 25, there would be no control means available to apply the trailer brakes, even though adequate vacuum exists in the tank 52, in the absence of the brake applying means comprising diaphragm 125, spring 133 and valve 107. Upon a failure of the character referred to, there would be no vacuum present in the chamber 75, and the same would be true of the chamber 127. Under such conditions, the spring 133 will move the diaphragm 125 upwardly to effect upward movement of the stem 61 to close the valve 63 and crack the diaphragm 65 away from the seat 66.

If a metered application of the trailer brakes under emergency conditions should be desired, the opening in the center of the diaphragm 114 may be reduced to whatever size is desired to control the flow of air therethrough upon movement of the valve 107 away from the valve seat 116.

In the form of the invention just described, a drop in vacuum in the supply line 24 below a predetermined point, for example 8" of mercury, reduces vacuum in the chamber 127 to permit the spring 133 to exert an upward force to move the stem 61. Such operation is assisted by the closing of the valve 115 and the opening of the bottom of the valve 107 to admit air beneath the diaphragm 93. This results in a relatively heavy application of the trailer brakes. The form of the invention shown in Figure 5 operates in the same manner as the form previously described so far as the functioning of the diaphragm 149 is concerned. However, there will be no admission of assisting air beneath the diaphragm 93 as in the previous case.

Referring to Figure 5, it will be noted that any dangerous decrease in vacuum in the supply line 24 will increase pressure in the chamber 75 and in the chamber 154 through passage 155. This action reduces downward force against the diaphragm 149, whereupon the spring 161 effects an upward movement of the stem 158 to engage this stem with the lower end of the stem 140. The force thus exerted upwardly on the stem 140 will not be equal to the force exerted upwardly against the stem 61 under similar conditions. The force of the spring 161, however, will be sufficient to close the valve 63 and crack the valve 65 to admit air from the chamber 48 to the chamber 49 and thence into the trailer brake motors 56. This results in the application of the trailer brakes, but not to the substantial extent as in the previously described form of the invention. A slower application of the trailer brakes however, may be more desirable than a substantial application of such brakes.

From the foregoing, it will be apparent that the present system provides a combined conversion valve and safety valve mechanism in a single unit. The conversion valve functions in accordance with conventional practice by the admission of fluid impulses into the chamber 99. The safety valve mechanism, however, will function to apply the trailer brakes if there is a trailer break-away, or if the vacuum fails or drops to a dangerous point. The present construction is further advantageous in the use of the check valve 81 which always functions to maintain the highest possible degree of vacuum in the storage tanks 52.

It is to be understood that the forms of the invention shown and described are to be taken as preferred examples of the same and that various changes in the shape, size, and arrangement of the parts may be made as do not depart from the spirit of the invention or the scope of the appended claims.

I claim:

1. A tractor-trailer brake system comprising normally air-suspended vacuum motors for applying the trailer brakes, a vacuum tank, a vacuum source, a vacuum supply line extending from the tractor to the trailer and connected to said source, a control line, means normally connecting said control line to said supply line and operative for disconnecting said control line from said supply line and admitting air to said control line, a valve normally positioned to disconnect said motors from said vacuum tank and connect them to the atmosphere, said valve being operable to disconnect said motors from the atmosphere and connect them to said vacuum tank, control means for said valve comprising a pair of chambers one of which is connected to said supply line and forms a part thereof and the other of which is connected to said control line and a pressure responsive element between said chambers and connected to said valve, whereby a rise in pressure in said control line moves said pressure responsive element to operate said valve to disconnect said motors from the atmosphere and connect them to said vacuum tank, a check valve having a seat arranged between said vacuum tank and said supply line independent of said pressure responsive element and subject to a predetermined differential pressure between said vacuum tank and said supply line, and means biasing said check valve toward said seat to normally close communication between said vacuum tank and said supply line to preserve in said vacuum tank the maximum vacuum available from said vacuum source, said check valve opening away from said third chamber.

2. A tractor-trailer brake system comprising normally air-suspended vacuum motors for applying the trailer brakes, a vacuum tank, a vacuum source, a vacuum supply line extending from the tractor to the trailer and connected to said source, a control line, means normally connecting said control line to said supply line and operative for disconnecting said control line from said supply line and admitting air to said control line, a valve normally positioned to disconnect said motors from said vacuum tank and connect them to the atmosphere, said valve being operable to disconnect said motors from the atmosphere and connect them to said vacuum tank, control means for said valve comprising a pair of chambers one of which is connected to said supply line and forms a part thereof and the other of which is connected to said control line and a pressure responsive element between said chambers and connected to said valve, whereby a rise in pressure in said control line moves said pressure responsive element to operate said valve to disconnect said motors from the atmosphere and connect them to said vacuum tank, a pressure responsive check valve having a seat arranged between said vacuum tank and said supply line independent of said pressure responsive element and subject to a predetermined differential pressure between said vacuum tank and said supply line, means biasing said check valve toward said seat to normally close communication between said vacuum tank and said supply line to preserve in said vacuum tank the maximum vacuum available from said vacuum source, emergency stop means responsive to a drop in vacuum in said supply line below a predetermined vacuum for effecting a rise in pressure in said other chamber independently of said control line, and means for preventing flow of air from said other chamber to said control line when pressure in said other chamber rises incident to operation of said emergency stop means.

3. A tractor-trailer brake system comprising normally air-suspended vacuum motors for applying the trailer brakes, a vacuum tank, a vacuum source, a vacuum supply line extending from the tractor to the trailer and connected to said source, a control line, means normally connecting said control line to said supply line and operative for disconnecting said control line from said supply line and admitting air to said control line, a valve normally positioned to disconnect said motors from said vacuum tank and connect them to the atmosphere, said valve being operable to disconnect said motors from the atmosphere and connect them to said vacuum tank, control means for said valve comprising a pair of chambers one of which is connected to said supply line and forms a part thereof and the other of which is connected to said control line and a pressure responsive element between said chambers and connected to said valve, whereby a rise in pressure in said control line moves said pressure responsive element to operate said valve to disconnect said motors from the atmosphere and connect them to said vacuum tank, a pressure responsive check valve having a seat arranged between said vacuum tank and said supply line independent of said pressure responsive element and subject to a predetermined differential pressure between said vacuum tank and said supply line, means biasing said check valve toward said seat to normally close communication between said vacuum tank and said supply line to preserve in said vacuum tank the maximum vacuum available from said vacuum source, emergency stop means responsive to a drop in vacuum in said vacuum line below a predetermined value for transmitting a mechanical force to said valve to operate it, said emergency stop means comprising a valve operative thereby for supplying air to said other chamber independently of said control line for operating said first-named valve, and a second pressure responsive check valve between said other chamber and said control line and subject to pressure differential therebetween to prevent a rise in pressure in the latter upon a rise in pressure in said other chamber incident to operation of said emergency stop means.

4. A tractor-trailer brake system comprising normally air-suspended vacuum motors for applying the trailer brakes, a vacuum tank on the trailer, a vacuum supply line connected at one end to a vacuum source and extending to the trailer, a control line extending from the tractor to the trailer and normally connected to a source of vacuum, means operative for disconnecting said control line from its source of vacuum and admitting air to said control line, and a valve unit on the trailer, said valve unit having a first chamber connected to said supply line, a second chamber connected to said motors, a third chamber connected to said vacuum tank, a normally closed check valve between said first and third chambers and biased toward said third chamber providing for flow from said third chamber to said first chamber but preventing reverse flow and trapping the maximum value of vacuum from said vacuum source, a valve element normally occupying a position connecting said second chamber to the atmosphere and operable for disconnecting such chamber from the atmosphere and connecting it to said third chamber, a control chamber in said valve unit, and pressure responsive means separating said first chamber from said control chamber, said control line having connection with said control chamber to increase pressures therein when said control line is connected to the atmosphere, said pressure responsive means being connected to said valve element to operate the latter upon an increase in pressure in said control chamber, said check valve operating independently of said pressure responsive means and forming a part of said third chamber and opening away from said third chamber.

5. A tractor-trailer brake system comprising normally air-suspended vacuum motors for applying the trailer brakes, a vacuum tank on the trailer, a vacuum supply line connected at one end to a vacuum source and extending to the trailer, a control line extending from the tractor to the trailer and normally connected to a source of vacuum, means operative for disconnecting said control line from its source of vacuum and admitting air to said control line, and a valve unit on the trailer, said valve unit having a first chamber connected to said supply line, a second chamber connected to said motors, a third chamber connected to said vacuum tank, a normally closed check valve between said first and third chambers and biased toward said third chamber providing for flow from said third chamber to said first chamber but preventing reverse flow and trapping the maximum value of vacuum from said vacuum source, a valve element normally occupying a position connecting said second chamber to the atmosphere and operable for disconnecting such chamber from the atmosphere and connecting it to said third chamber, a control chamber in said valve unit, pressure responsive means separating said first chamber from said control chamber, said control line having connection with said control chamber to increase pressures therein when said control line is connected to the atmosphere, said pressure responsive means being connected to said valve element to operate the latter upon an increase in pressure in said control chamber, said check valve operating independently of said pressure responsive means and forming a part of said third chamber, a stem connected at one end to said valve element and connected to said pressure responsive means, a second pressure responsive means having a portion engaging the other end of said stem, said second pressure responsive means comprising a spring biasing said portion toward said stem to tend to operate said valve, and means comprising a chamber communicating with said supply line whereby said second pressure responsive means is responsive to a drop in vacuum in said supply line below a predetermined value for rendering said biasing means operative for moving said stem.

6. A tractor-trailer brake system comprising normally air-suspended vacuum motors for applying the trailer brakes, a vacuum tank on the trailer, a vacuum supply line connected at one end to a vacuum source and extending to the trailer, a control line extending from the tractor to the trailer and normally connected to a source of vacuum, means operative for disconnecting said control line from its source of vacuum and admitting air to said control line, and a valve unit on the trailer, said valve unit having a first chamber connected to said supply line, a second chamber connected to said motors, a third chamber connected to said vacuum tank, a normally closed check valve between said first and third chambers and biased toward said third chamber providing for flow from said third chamber to said first chamber but preventing reverse flow and trapping the maximum value of vacuum from said vacuum source, a valve element normally occupying a position connecting said second chamber to the atmosphere and operable for disconnecting such chamber from the atmosphere and connecting it to said third chamber, a control chamber in said valve unit, pressure responsive means separating said first chamber from said control chamber, said control line having connection with said control chamber to increase pressures therein when said control line is connected to the atmosphere, said pressure responsive means being connected to said valve element to operate the latter upon an increase in pressure in said control chamber, said check valve operating independently of said pressure responsive means and forming a part of said third chamber, pressure responsive means connected to and responsive to a drop in vacuum in said supply line below a predetermined value, such means being mechanically connected to said valve element for applying a force to said valve element independently of said pressure responsive means for operating said valve element, and valve means connected to said last-named means to be operated thereby for admitting air to said control chamber independently of pressures in said control line.

7. A tractor-trailer brake system comprising normally air-suspended vacuum motors for applying the trailer brakes, a vacuum tank on the trailer, a vacuum supply line connected at one end to a vacuum source and extending to the trailer, a control line extending from the tractor to the trailer and normally connected to a source of vacuum, means operative for disconnecting said control line from its source of vacuum and admitting air to said control line, and a valve unit on the trailer, said valve unit having a first chamber connected to said supply line, a second chamber connected to said motors, a third chamber connected to said vacuum tank, a normally closed check valve between said first and third chambers and biased toward said third chamber providing for flow from said third chamber to said first chamber but preventing reverse flow and trapping the maximum value of vacuum from said vacuum source, a valve element normally occupying a position connecting said second chamber to the atmosphere and operable for disconnecting such chamber from the atmosphere and connecting it to said third chamber, a control chamber in said valve unit, pressure responsive means separating said first chamber from said control chamber, said control line having connection with said control chamber to increase pressures therein when said control line is connected to the atmosphere, said pressure responsive means being connected to said valve element to operate the latter upon an increase in pressure in said control chamber, said check valve operating independently of said pressure responsive means and forming a part of said third chamber, means responsive to a drop in vacuum in said supply line below a predetermined value for applying a force to said valve element independently of said pressure responsive means for operating said valve element, means connected to be operated by said last-named means for admitting air to said control chamber independently of pressures in said control line, and a second check valve between said control chamber and said control line closing toward the latter.

8. A valve mechanism comprising a first chamber adapted for connection with a vacuum source, a second chamber adapted for connection with a vacuum motor, a third chamber adapted for connection with a vacuum tank, a normally closed check valve between said first and third chambers normally biased toward said third chamber and forming a part thereof and opening away from said third chamber, a valve element normally positioned to connect said second chamber to the atmosphere and operable for disconnecting said second chamber from the atmosphere and connecting it to said third chamber, and means for operating said valve element, said check valve operating independently of said valve element.

9. A valve mechanism comprising a first chamber adapted for connection with a vacuum source, a second chamber adapted for connection with a vacuum motor, a third chamber adapted for connection with a vacuum tank, a normally closed check valve between said first and third chambers normally biased toward said third chamber and forming a part thereof and opening away from said third chamber, a valve element normally positioned to connect said second chamber to the atmosphere and operable for disconnecting said second chamber from the atmosphere and connecting it to said third chamber, a control chamber adapted for connection with a source of variable pressure, and a pressure responsive element between said control chamber and said first chamber and connected to said valve element whereby an increase in pressure in said control chamber operates said valve element, said check valve operating independently of said valve element.

10. A valve mechanism comprising a first chamber adapted for connection with a vacuum source, a second chamber adapted for connection with a vacuum motor, a third chamber adapted for connection with a vacuum tank, a normally closed check valve between said first and third chambers normally biased toward said third chamber and forming a part thereof, a valve element normally positioned to connect said second chamber to the atmosphere and operable for disconnecting said second chamber from the atmosphere and connecting it to said third chamber, a control chamber adapted for connection with a source of variable pressure, a pressure responsive element between said control chamber and said first chamber and connected to said valve element whereby an increase in pressure in said control chamber operates said valve element, said check valve operating independently of said valve element for trapping maximum vacuum available to a system in which said valve mechanism is incorporated, energy storing means engageable with said valve element for raising the pressure in said control chamber independently of pressures in said variable source, and a second check valve between said control chamber and said variable source closing away from said control chamber for permitting automatic operation of said valve independent of the source of variable pressure.

References Cited in the file of this patent

UNITED STATES PATENTS

| | | |
|---|---|---|
| 1,973,326 | Besler | Sept. 11, 1934 |
| 2,030,784 | Dessart | Feb. 11, 1936 |
| 2,099,453 | Searle | Nov. 16, 1937 |
| 2,204,706 | Searle | June 18, 1940 |
| 2,582,612 | Williams | Jan. 15, 1952 |
| 2,645,239 | Horn et al. | July 14, 1953 |
| 2,670,247 | Almond | Feb. 23, 1954 |